(No Model.)

J. CLAYTON.
VALVE FOR AIR OR GAS COMPRESSORS, &c.

No. 587,704. Patented Aug. 10, 1897.

Witnesses.
John N. Tilly
Edward Vieser

Inventor
James Clayton
by attorneys
Brown & Seward

UNITED STATES PATENT OFFICE.

JAMES CLAYTON, OF BROOKLYN, NEW YORK.

VALVE FOR AIR OR GAS COMPRESSORS, &c.

SPECIFICATION forming part of Letters Patent No. 587,704, dated August 10, 1897.

Application filed March 18, 1897. Serial No. 628,133. (No model.)

*To all whom it may concern:*

Be it known that I, JAMES CLAYTON, of the city of Brooklyn, in the county of Kings and State of New York, have invented a new and useful Improvement in Valves to be Used in Air or Gas Compressors and for other Purposes, of which the following is a specification.

This invention relates to valves of the puppet class, and is especially applicable in cases where such valves work under a very high pressure with a constant tendency to slamming when they come in contact with their seats.

The object of the improvement is to cause the valve to seat itself quietly and easily and with little shock, and also to diminish the wear of the valve and seat.

I will proceed to describe the invention with reference to the accompanying drawings and afterward point out its novelty in claims.

Figure 1:
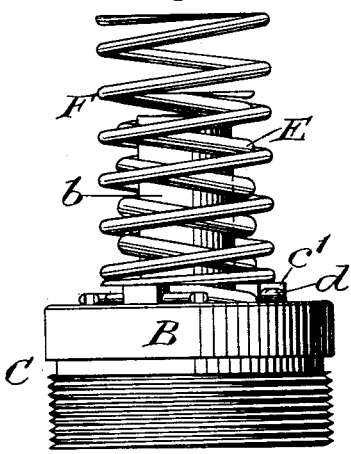
Figure 2:
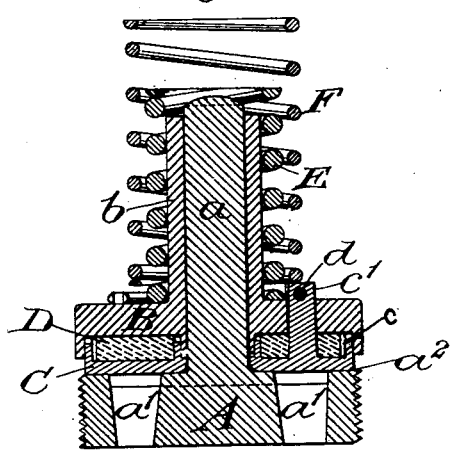
Figure 3:
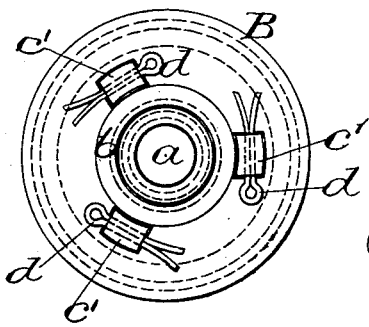

Figure 1 represents a side view of a valve-seat and a valve embodying my invention. Fig. 2 represents a central section of the same; Fig. 3, a plan or back view of the same.

Similar letters of reference designate corresponding parts in all the figures.

A designates the valve-seat, in the center of which is a fixed spindle $a$, serving as a guide for the valve and in which surrounding the spindle are any number of openings $a'$. This seat and spindle are of known construction. The seat is represented as screw-threaded for the purpose of securing it in place and as having a flat face $a^2$, but these features are immaterial to my improvement.

The valve consists of three parts—viz., a head B, a facing-disk C, and an interposed elastic disk or ring D. The head B is made with a hollow guiding-stem $b$, which is bored to fit the spindle $a$ loosely. The facing-disk C is also bored centrally to fit the spindle. The head B and the facing-disk C are made with surrounding marginal flanges $c$, which fit together to form between the said head and disk a complete box, in which the elastic ring is inclosed. This ring is of vulcanized india-rubber, and in its normal condition it fits loosely to the box. The facing-disk C is provided on its back with two or more stems $c'$ $c'$, of which three are represented. The said stems pass through holes provided for them in the disk or ring D and in the portion of the valve-head B outside of the main stem, and they project beyond the crown of the valve-head, the so-projecting parts having holes made transversely through them to receive cotter-pins $d$, by which the head and the facing-disk are held together in such manner that the elastic ring D is held somewhat loosely within the box provided for it.

The valve thus constructed is preferably provided with two closing-springs E F, represented as coil-springs, one, E, pressing directly upon the back of the head and the other, F, which surrounds E, pressing upon the stems of the facing-disk. These springs may abut against any suitable bearing in the chest or box in which the valve is placed.

The valve-head and its stem may be made of any suitable metal—brass, for example— and the facing-disk may be made of any other metal—aluminium, for example—as may be found most suitable for the face of the valve.

In the closing operation of the valve the elastic cushion disk or ring D, interposed between the valve-head and facing-disk and so emboxed, serves as a cushion to ease the closing movement and reduce or prevent the slamming. The slight play which is allowed by the stems $c'$ and their cotter-pins between the valve-head and the facing-disk provides for a desirable degree of dilation and contraction of the cushion disk or ring, which being protected by the metal facing-disk from direct exposure to the heat of the compressed air or gas is more durable than when applied to the valve to constitute of itself the face thereof and subject to the impingement upon it of the air or gas.

What I claim as my invention is—

1. In a puppet-valve the combination with a valve-head and an attached guiding-stem, of a facing-disk fitted to the valve-head and provided with a plurality of stems passing through holes in the said head outside of its guiding-stem, an elastic cushion-disk between said head and facing-disk and means for securing said plurality of stems loosely to the valve-head, substantially as herein described.

2. The combination with a puppet-valve, of a metal facing-disk provided with stems which pass loosely through the openings in the head of said valve, a cushion-ring interposed between the valve-head and facing-disk, a closing-spring applied to the valve-head, and another closing-spring applied to press upon the stems of the facing-disk, substantially as herein described.

JAMES CLAYTON.

Witnesses:
 FREDK. HAYNES,
 GEORGE BARRY, Jr.